(12) United States Patent
Van Ingen et al.

(10) Patent No.: US 11,845,231 B2
(45) Date of Patent: Dec. 19, 2023

(54) CONDUCTION WELDING

(71) Applicant: Fokker Aerostructures BV, Papendrecht (NL)

(72) Inventors: Jaap Willem Van Ingen, Papendrecht (NL); Marco Doldersum, Papendrecht (NL); John Teunissen, Papendrecht (NL); Arnt Offringa, Papendrecht (NL)

(73) Assignee: Fokker Aerostructures BV, Papendrecht (NL)

( * ) Notice: Subject to any disclaimer, the term of this patent is extended or adjusted under 35 U.S.C. 154(b) by 495 days.

(21) Appl. No.: 16/646,219

(22) PCT Filed: Sep. 12, 2018

(86) PCT No.: PCT/EP2018/074655
§ 371 (c)(1),
(2) Date: Mar. 11, 2020

(87) PCT Pub. No.: WO2019/053086
PCT Pub. Date: Mar. 21, 2019

(65) Prior Publication Data
US 2020/0276769 A1  Sep. 3, 2020

(30) Foreign Application Priority Data

Sep. 14, 2017 (GB) ..................... 1714799

(51) Int. Cl.
*B29C 65/32* (2006.01)
*B29C 65/22* (2006.01)
(Continued)

(52) U.S. Cl.
CPC .............. *B29C 65/32* (2013.01); *B29C 65/22* (2013.01); *B29C 66/721* (2013.01);
(Continued)

(58) Field of Classification Search
CPC ....... B29C 65/32; B29C 65/22; B29C 66/721; B29C 66/91221; B29C 66/841;
(Continued)

(56) References Cited

U.S. PATENT DOCUMENTS 4,992,133 A * 2/1991 Border ................ B29C 65/3668
100/312
5,538,590 A  7/1996 Riley
(Continued)

FOREIGN PATENT DOCUMENTS

CN  2172196 Y  7/1994
CN  102159060 A  8/2011
(Continued)

OTHER PUBLICATIONS

International Search Report and Written Opinion for PCT/EP2018/074655 dated Nov. 22, 2018 (11 pages).
(Continued)

*Primary Examiner* — George R Koch
(74) *Attorney, Agent, or Firm* — Bejin Bieneman PLC (57) ABSTRACT

A welding apparatus for a fibre reinforced resin based material comprises an elongate flexible heat conductive strip and an elongate heat sink extending around at least a portion of the perimeter of the conductive strip. The elongate heat sink is divided into a plurality of segments wherein adjacent segments can move relative to one another.

19 Claims, 9 Drawing Sheets

(51) Int. Cl.
*B29C 65/00* (2006.01)
*H05B 3/40* (2006.01)
*H05B 6/14* (2006.01)

(52) U.S. Cl.
CPC ......... *B29C 66/91221* (2013.01); *H05B 3/40* (2013.01); *H05B 6/14* (2013.01)

(58) Field of Classification Search
CPC ............ B29C 66/8414; B29C 66/8416; B29C 66/9121; H05B 3/40; H05B 6/14
See application file for complete search history.

(56) References Cited

U.S. PATENT DOCUMENTS

| | | |
|---|---|---|
| 2004/0139701 A1 | 7/2004 | Cady et al. |
| 2007/0044922 A1* | 3/2007 | Mischler ............... B29C 70/382 |
| | | 156/574 |
| 2012/0018419 A1* | 1/2012 | Chan ................. B29C 66/91231 |
| | | 219/541 |
| 2012/0080418 A1* | 4/2012 | Sakamoto ......... B29C 66/91443 |
| | | 219/243 |
| 2015/0068662 A1* | 3/2015 | Wang .................. B29C 66/8322 |
| | | 156/73.1 |

FOREIGN PATENT DOCUMENTS

| | | | |
|---|---|---|---|
| CN | 104607794 A | 5/2015 | |
| CN | 106274015 A | 1/2017 | |
| CN | 107984868 A | 5/2018 | |
| DE | 1479840 A1 | 4/1969 | |
| DE | 102012215105 A1 * | 2/2013 | ............ B29C 65/38 |
| DE | 102012215105 A1 | 2/2013 | |
| FR | 1244751 A | 10/1960 | |
| FR | 2102967 A5 | 4/1972 | |
| JP | S4874870 U | 9/1973 | |
| WO | WO1992008613 A1 * | 5/1992 | |

OTHER PUBLICATIONS

Chinese Office Action dated Sep. 3, 2021 for Application No. CN201880059749.X (21 pages; with English translation).

* cited by examiner

CONDUCTION WELDING

CROSS-REFERENCE TO RELATED APPLICATIONS

This application is a national stage of, and claims priority to, Patent Cooperation Treaty Application No. PCT/EP2018/074655, filed on Sep. 12, 2018, which application claims priority to Great Britain Application No. GB1714799.2, filed on Sep. 14, 2017, which applications are hereby incorporated herein by reference in their entireties.

BACKGROUND

Composite laminates are now used widely in the automotive and aerospace industries to provide strong structures with minimal weight. Composite structures, such as panels and reinforcement ribs (or the like) can be coupled together in many different ways including conventional couplings such as rivets or nuts and bolts.

Alternative methods have evolved which advantageously dispense with the need for these types of couplings and involve welding the composite components directly together. These welding techniques involve heating portions of the laminate material to a temperature at which the resin within the composite begins to soften and melt. Pressure is then applied over a period of time causing the resin in the respective components to melt together. Removal of the heat and pressure allows the components to cool and the resin re-sets leaving the two (or more) components fastened together.

In many applications a simple welding process is sufficient to meet the requirements of the given application. However, in application with strict safety requirements conventional welding techniques become unreliable. Specifically, conventional techniques can cause uneven welds which may contain delaminations (separations of layers within the composite structure) or voids. These defects may be invisible on the surface of the components or may be in the form of distortions on or around the weld area.

Internal and surface defects are of particular concern in applications such as the aerospace industry where composite components form structural or aerodynamic components of an aircraft. The strict requirements in the aerospace industry have consequently limited the use of laminate welding because of these defects.

SUMMARY

The present disclosure concerns an improved welding apparatus and method for connecting, and specifically welding, composite laminates together.

An unconventional welding method and apparatus which allows composite components to be reliably welded together is disclosed herein. The technique and method also allows for complex geometries to be welded and furthermore can accommodate local thickness variations and shallow ramps. A void and delamination free weld can thereby be achieved which is highly desirable in aerospace (and other) applications both in terms of aesthetics of the weld and also structural integrity. This is particularly the case for primary structures formed from carbon fibre components in the aerospace industry.

Viewed from a first aspect there is provided a welding apparatus for a fibre reinforced thermoplastic resin based material, the welding apparatus comprising an elongate flexible heat conductive strip and an elongate heat sink extending around at least a portion of the perimeter of the conductive strip, wherein the elongate heat sink is divided into a plurality of segments wherein adjacent segments can move relative to one another.

Thus, instead of adopted the conventional approach of using rigid bodies for conduction heating, a modified and flexible strip is used. The flexible strip can follow local thickness variations, even shallow ramps, if properly pressurized and can therefore generate an even weld pressure resulting in void free welds.

Advantageously heat sinks are applied next to the welded area to pull the heat out of the laminate. Due to the heat sinks the laminate outside the pressurized zone remains below the melting temperature. This avoids the delamination and consequently voids do not occur.

A number of surprising technical and commercial advantages are provided over conventional welding techniques. For example, welding of thermoplastic parts can substantially reduce the number of fasteners which can reduce the weight of the joined component and also save up to 30% on assembly costs.

Furthermore, the welding approach described herein provides other technical advantages including:

- Robust welding of thermoplastic composite parts using a flexible heated tool allows able typical part thickness tolerances and small gaps to be accommodated.
- Robust welding of carbon composite laminates covered with metal lightning strike mesh is also possible.
- Welding with a small weld tool which can make welds in confined spaces and can be installed as end effector on a robot.
- Heating and pressurization from one side meaning that OML surfaces can remain smooth and accurate (rigid tool on OML side).

As discussed above the counterintuitive approach of providing a flexible heat sink in conjunction with a flexible heat conductive strip allows for contours and manufacturing inconsistencies to be accommodated in the welding tool. This ensures that heat is conducted uniformly across the component during the welding process preventing non-uniform welds being formed i.e. welds that may contain delamination, voids or other unwanted effects.

The elongate flexible conductive strip may be any suitable material that can communicate the necessary temperature to melt the resin in the chosen material to be welded. For example, the strip may be an elongate metallic strip such as invar, stainless steel or another suitable high temperature material.

Similarly, the heat sink may be formed of any suitable material and has the function of communicating heat away from the laminate i.e. opposite to the purpose of the conductive strip.

The heat sink is generally in the form a U-shaped section with a backing portion and two side portions extending away from the back portion. This creates a void in the middle of the heat sink into which the conductive strip and heating means (discussed below) can be positioned.

The flexibility, i.e., the ability for the heat sink to deflect in a curve along its length (see FIG. 3) may be achieved by partially or completely slicing the heat sink. Slots may thus be formed through the backing portion and along the side portions. Slicing the heat sink in this way creates a series of segments. If the heat sink is then loaded against a curved surface the segments can change angle depending on whether the deformation is a concave deformation or convex deformation. The heat sink can be held together as a single component by limiting the slice or slots to a partial length of each side portion's length.

On deflection adjacent segments deflect relative to one another depending on the radius of curvature of the deformation on the laminate surface.

In a heat sink arrangement comprising slots, each slot may be typically used to accommodate natural thickness variation in the part surface. Thus, the required deformation is very small and so the slot minimum width is only limited by the tool manufacturing requirements.

Alternatively, the slots or slices may be formed through the entire depth of the heat sink so as to form a plurality of independent segments. As individual segments the adjacent segments move up and down relative to each other depending on the deformation of the laminate surface.

In such an arrangement with a completely sliced heat sink combined with a completely sliced flexible strip (FIGS. 9 and 10 discussed in detail below) much larger thickness variations such as ramps in a skin can be advantageously accommodated.

Advantageously each segment may be electrically insulated from an adjacent segment. Thus, eddy currents can be prevented from developing in each segment in an arrangement where an induction coil is used as the heating element.

Each side portion of the heat sink is arranged to contact the laminate surface along a distal edge (measured from the base of the U shape). This forms a continuous surface which can be brought into contact with the laminate along the edge or perimeter of the elongate strip—specifically the long sides of the strip. In effect the heat conducting strip is sandwiched between the two edges of the heat sink along its longest edges.

These edges can collect heat from the laminate during the welding process and advantageously draw heat away from the laminate immediately outside of the weld zone. This prevents heat from travelling laterally.

To locate the strip within the distal end of the U shape whilst maintaining contact of the heat collecting edge of the heat sink, the heat sink may be stepped in a manner that seats the strip within the open end of the heat sink.

Advantageously the stepped profile is such that a portion of the flexible strip extends beyond the most distal part of the heat collecting edge. Thus, during the welding process the strip makes contact with the laminate first and begin to soften the resin. The strip then penetrates the surface to a predetermined depth before the heat sink edge abuts with the surface of the laminate and collects heat.

The optimum depth values will depend on the specific arrangement and part to be manufactured. In one example a target of 0.1+/−0.1 mm may be used, to account for tool manufacturing tolerance and to prevent the conductive strip being below the heat sinks The void within the heat sink may be provided with any suitable heat source which can communicate heat to the elongate flexible (and heat conducting) strip. For example, an electrical induction coil may extend along the length of the apparatus. Advantageously a coil can conveniently follow the deformations caused by the laminate surface profile.

An electrical resistance heated rod as a heat source may also be used in conjunction with the invention.

To prevent electrical current passing into the heat sink and/or into the strip the coil may be surrounded by one or more electrical insulators. For example, a pair of insulators may be provided, wherein the first side of the electrical conductor faces the elongate flexible strip and the opposing side of the electrical conductor faces the void within the heat sink.

The elongate heat sink, elongate flexible strip, electrical conductor and electrical insulators may be conveniently received in a blind recess formed in a housing of the welding apparatus. As discussed below the blind recess provides:
  a housing for the subcomponents of the apparatus;
  a means to restrict i.e. control the movement of the segments of the heat sink;
  a surface against which a weld pressure can be generated; and
  a body to collect heat from the heat sinks with passive or active cooling means.

The weld pressure is applied to the backing portion of the heat sink which in turn applies a load, via the stepped portion described above, to the flexible strip. Thus, the strip and heat sink are brought into contact with the laminate surface using a predetermined pressure. This force can be applied in a variety of ways, for example using actuators, cams or the like.

However, the inventors have established that a convenient means to apply the load needed to effect the welding is to incorporate an inflatable hose or bladder into the blind recess and locate this behind the heat sink. Thus, upon inflation the hose expands and exerts a force against the heat sink driving the heat sink (and flexible strip) towards the laminate surface.

In order to protect the flexible hose from the heat gathered by the heat sink an insulating layer may advantageously be introduced between the heat sink and the hose.

In order to monitor the actual temperatures in the weld one or more suitable thermocouples may be used. For example, a small non-contact pyro meter at the non heated side of the weld may be used to monitor the heat in the material. Use of a temperature sensor may advantageously guarantee a predetermined weld temperature has been reached.

Additionally, this also prevents 'kissing bonds,' i.e., welds formed at too low a temperature and therefore insufficient strength. Such defective welds are not always detectable by non-destructive testing (NDT) techniques.

Viewed from another aspect there is provided a method of welding a first thermoplastic based component to a second fibre reinforced resin based component, the welding apparatus comprising an elongate flexible heat conductive strip and an elongate heat sink extending around at least a portion of the perimeter of the conductive strip, wherein the elongate heat sink is divided into a plurality of segments wherein adjacent segments can move relative to one another, the method comprising the step of bringing the welding apparatus into contact with the first fibre reinforced resin based component and applying a force such that the heat sink and flexible heat conductive strip deform such that the strip and heat sink align with the surface profile of the first component.

The tooling remains on the product until the weld has cooled to below 200° C. This results in the cooling profile described herein with reference to FIG. 11. It has been established that if cooling rate is too fast, for instance for sufficient crystallinity in the resin, a slower cooling rate can be incorporated by a controlled ramp down of the heating means set point.

Viewed from a yet further aspect there is provided a welding apparatus for a thermoplastic based material, the welding apparatus comprising a flexible elongate heat conductive strip and an associated heat sink extending laterally from the longest edges of the elongate strip, wherein the heat sink is deformable along the length of the strip so as to align in use with deformations in a thermoplastic based material to be welded.

Viewed from yet another aspect there is provided a welding apparatus for a thermoplastic based material, the welding apparatus comprising a flexible elongate heat conductive strip and an associated heat source arranged to direct heat in a first direction to a laminate surface to be welded; and a heat sink extending laterally from the longest edges of the elongate strip and arranged to collect heat from the laminate surface and to communicate heat in a second opposing direction, wherein the heat sink is deformable along the length of the strip so as to align in use with deformations in a thermoplastic based material to be welded.

Viewed from a still further aspect a welding apparatus and method may be applied by means of a robotic arm or beam to provide a computer controlled welding process.

BRIEF DESCRIPTION OF THE DRAWINGS

Aspects of the disclosure will now be described, by way of example only, with reference to the accompanying figures in which.

While the invention is susceptible to various modifications and alternative forms, specific embodiments are shown by way of example in the drawings and are herein described in detail. It should be understood however that drawings and detailed description attached hereto are not intended to limit the invention to the particular form disclosed but rather the invention is to cover all modifications, equivalents and alternatives falling within the spirit and scope of the claimed invention It will be recognised that the features of the aspects of the invention(s) described herein can conveniently and interchangeably be used in any suitable combination. It will also be recognised that the invention covers not only individual embodiments but also combinations of the embodiments that have been discussed herein.

DETAILED DESCRIPTION

Figure 1A:
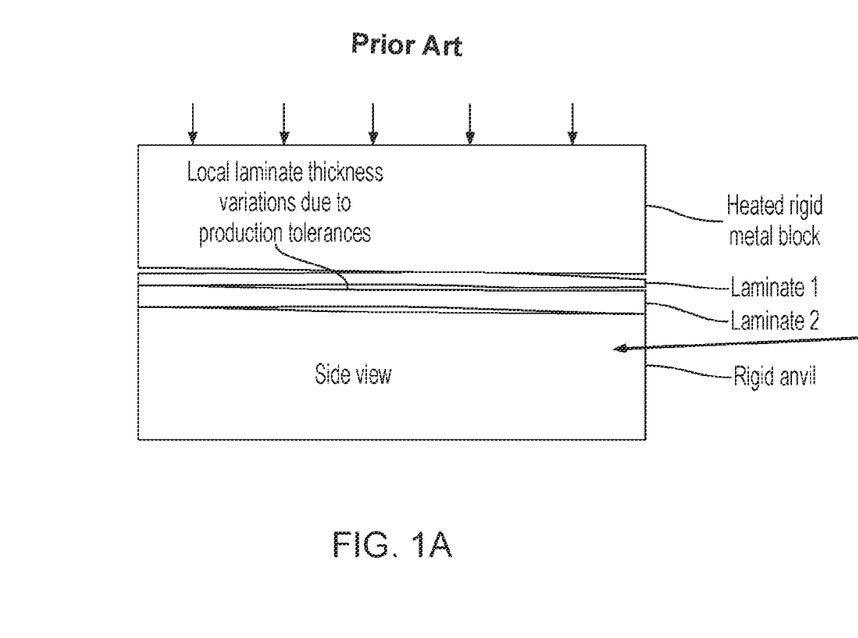
FIGS. 1A and 1B illustrate two laminates and the variations between laminate surface geometries.
Figure 1B:
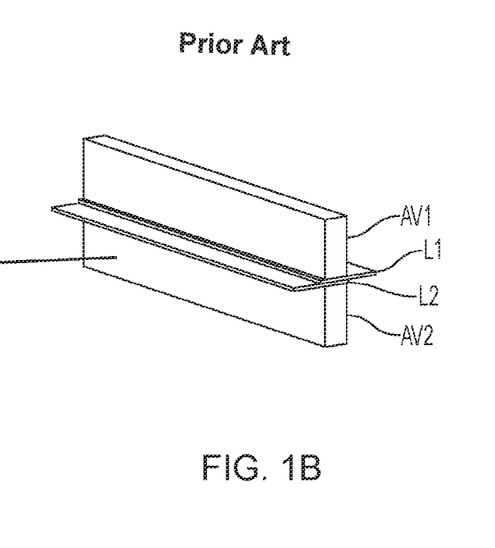

FIGS. 1A and 1B illustrate two laminates and the variations between laminate surface geometries. Referring first to FIG. 1B, two laminates (L1, L2) are shown which are to be joined (welded) together.

In this example the laminates are formed of carbon fibres contained within a thermoplastic resin. These are conventionally known as carbon fibre reinforced thermoplastics (CFRP). It will be recognised that the apparatus and method described herein may equally be applied to other materials using a resin material to entrain fibres.

FIG. 1B illustrates a conventional arrangement for welding the two laminates (L1, L2) together. The simple process involves arranging the two laminates between an upper and lower anvil (AV1, AV2). One of the anvils is heated and the two anvils are biased towards each other to create a welding pressure. The heat is conducted through the anvil to the laminate and the resin within the laminates is caused to melt. The biasing force causes the resins to merge together. The anvils are then released, cooled down and the resin re-hardens or sets and the weld is formed.

A conventional welding arrangement such as this has allowed composite laminates to be easily and conveniently joined (welded) together.

However, referring to FIG. 1A, it can be seen that the laminates are not always perfectly uniform and flat. This is a result of the way in which laminates are formed, i.e., as a plurality of individual layers which are then cured together. The result of that manufacturing process is variations in surface profiles resulting in spaces or cavities as illustrates in FIG. 1A. Conventionally, these cavities can be accommodated by increasing the biasing pressure or force between the anvils in FIG. 1B and/or increasing the temperature or duration of welding. Thus, the cavities can be removed.

However, whilst this can solve the problems illustrated in FIG. 1A the inventors have established that it causes other detrimental effects to the weld and also the region of the component surrounding the weld.

Figure 2A:
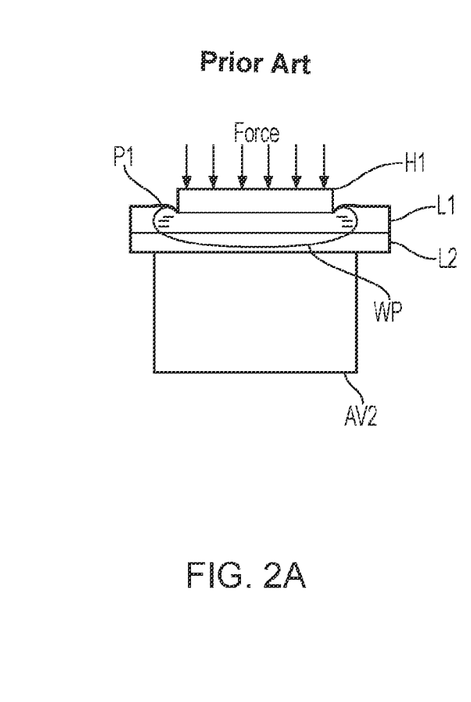
FIGS. 2A, 2B and 2C show a conventional lamination welding arrangement (2A) and a modified welding arrangement according to the present disclosure (2B and 2C)

With reference to FIG. 2A a conventional heater H1 can be seen which is biased or forced towards the opposing anvil AV2 causing laminates L1 and L2 to be forced together. The heater is activated and a weld pool of resin WP is formed which extends through the two laminates L1 and L2. However, at the perimeter of the weld P1 delamination can occur due to a combination of the thermal gradient and weld pressure being applied to create the weld.

Delamination occurs if the laminate is heated to above the melt temperature without sufficient pressure. This is due to a form of pre-tension or compression in the laminate which is inherited during manufacture of the laminate, which itself is generally performed at high pressure. Furthermore, outgassing in the resin can create voids if heated to above the melt temperature without a suitable pressure being applied.

When heating is deactivated and the weld force removed (after cooling to below 200° C.) the resins within the weld pool re-set and the two laminate are welded together along the weld line, i.e., when heating is deactivated the resin within the weld pool cools down and re-sets and the two laminate are welded together along the weld line. The weld force is removed after cooling to below 200° C. However, as described above regions surrounding and extending along the weld can suffer from delamination and other discontinuities within the material. Such discontinuities can be detrimental to the structural integrity of the component and to the weld which, as discussed above, is of particular concern for primary aerospace components.

Figure 2B:
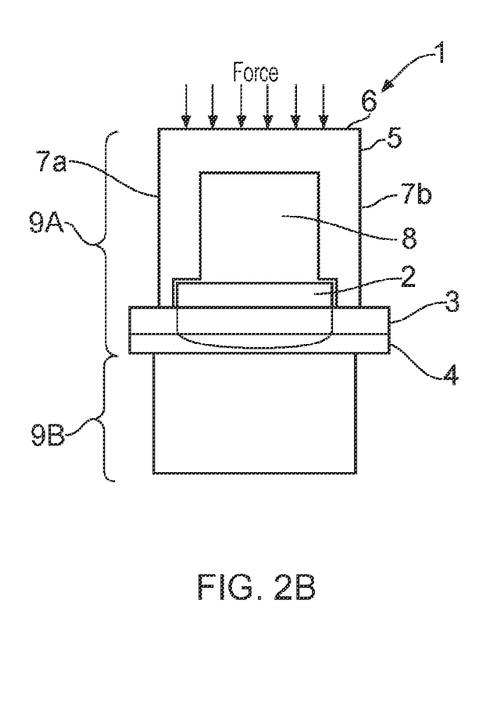

FIG. 2B show the modified welding apparatus 1 of the present disclosure.

The welding tool or apparatus 1 comprises a flexible and elongate metallic (or other heat conductive) strip 2 centrally located in the tool with respect to the weld line. The strip 2 is relatively thin such than it can flex along its length (not shown in FIG. 2). As shown the strip 2 can be brought into contact with a first laminate layer 3, which is itself positioned against a second layer 4, such that the two can be joined i.e. welded together on activation of the tool as described below.

The tool comprises a heat sink 5 arranged to surround the strip. The heat sink 5 is in the form of a horizontal upper section 6 and two side section 7a, 7a defining a U-shaped cross-section and forming a cavity or space 8 within the heat sink and closed on the lower end by the strip 2.

Each of the side sections 7a, 7b of the heat sink cooperate with the strip 2 in a stepped manner as shown in FIG. 2B. Specifically, each side section 7a, 7b comprises a first portion which engages with the upper surface of the strip and a section portion which extends down the side of the strip to and is sufficiently long to contact the first laminate 3. In effect the strip 2 is located or housed within the heat sink 7.

The strip 2, and heat sink 5 define a first portion 9A of the tool 9A which operates on a first side of the laminates 3, 4 (in FIG. 2B an upper side). An opposing portion of the tool 9B is arranged on the opposing side of the laminates 3, 4 and provides a surface against which the welding force can be applied. For example, the tool 9B may be a table and the tool 9A may be a movable head mounted on a robotic arm.

Figure 2C:
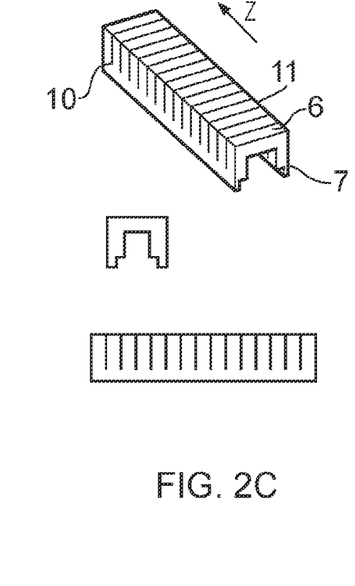

FIG. 2C shows the heat sink in isolation in isometric view, in cross-section and additionally a side elevation of the heat sink. FIG. 2C shows the length of the heat sink extending in the z direction. As shown the heat sink comprises a plurality of slits or slots 10 extending from the upper surface 6 towards the ends of the side sections proximate the space which received the strip (not shown in FIG. 2C). The slits or slots 10 divide the heat sink into a plurality of segments 11. All of the segments 11 are connected together at the base of the heat sink 5 where the slits or slots terminate. In effect a portion of the heat sink at the ends of each side section 7a, 7b forms a root which connects the segments together. Each segment 11 has a cross-section as shown in FIG. 2B.

FIG. 2C also shows a side elevation of the heat sink illustrating the uniform spacing of the slits. However, the precise spacing of the slits (and size of the segments) is dependent on the desired welding characteristics.

FIG. 2C further shows the stepped profile of the distal ends of the side section of the heat sink with the longer portion arrange (in use) to contact the laminate to be welded which is described in more detail with reference to FIG. 4.

Figure 3:
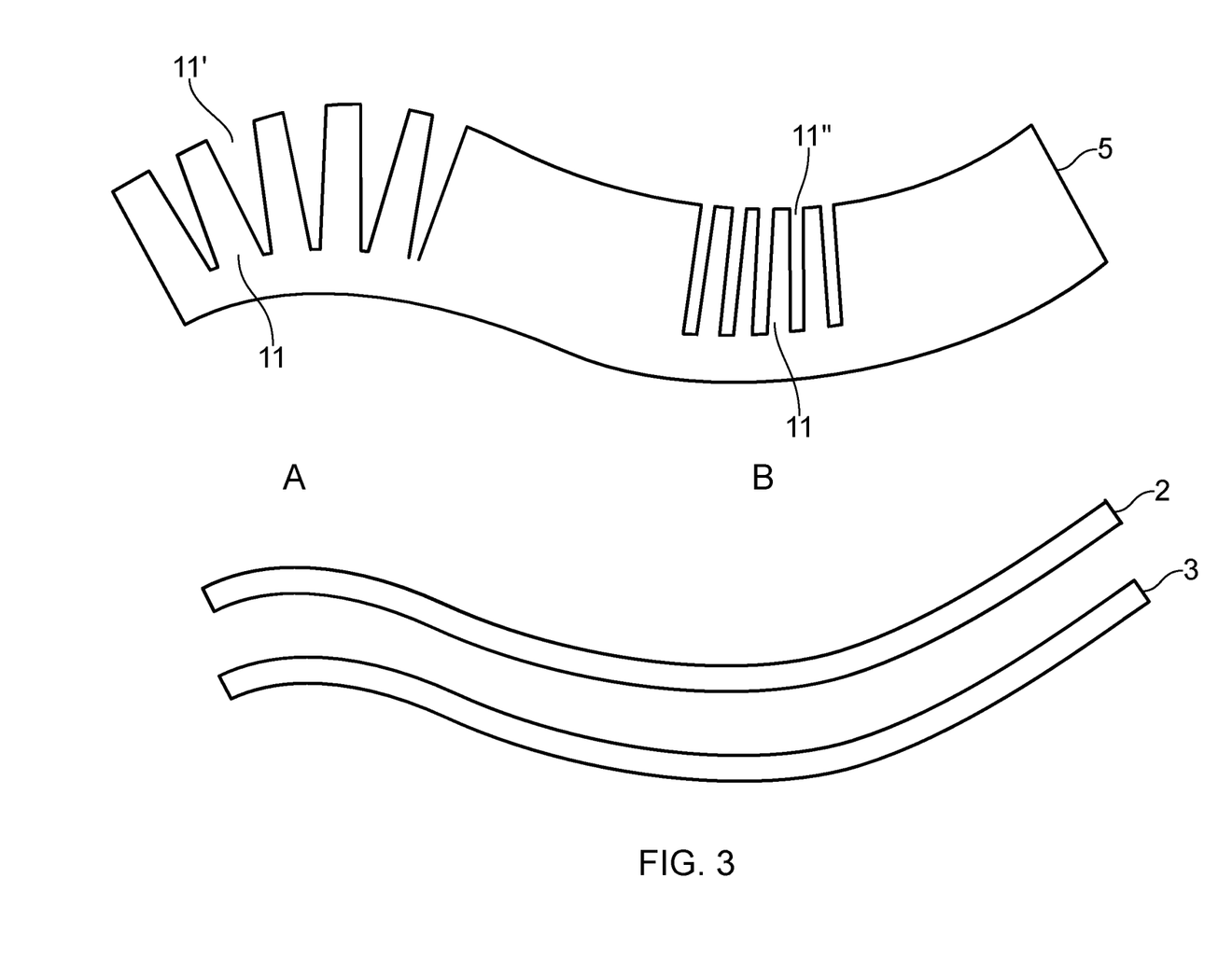
FIG. 3 shows an enlarged and exaggerated cross-section of the heat sink, conductive strip and laminate.

FIG. 3 shows an enlarged and exaggerated cross-section of the heat sink 5, strip 2, and laminate 3. The cross-section is exaggerated in the curvature of the heat, strip and laminate to illustrate more clearly how the slits 11' between segments 11 allow the heat sink to accommodate an uneven or undulating surface.

As shown in region A the heat sink is arranged over a convex profile of an underlying laminate. Here the segments are permitting to fan or spread out with the slits 11' becoming larger away from the root. Conversely, in region B the heat sink is arranged over a concave profile of an underlying laminate. Here the segments are permitted to close together with the slits 11' become smaller away from the root. It will be appreciated that the slits thereby allow the heat sink to accommodate variations in the laminate surface profile whilst maintaining contact with the strip 2 and laminate 3.

FIG. 3 is an exploded view of heat sink, strip and laminate. It will be recognised that in use the heat sink and flexible strip 2 are coupled together (as described with reference to FIG. 2B) and are then brought into contact with the laminate surface 3. As shown, the flexibility of both the heat sink and strip allows them to match the contours of the laminate (exaggerated).

Figure 4:
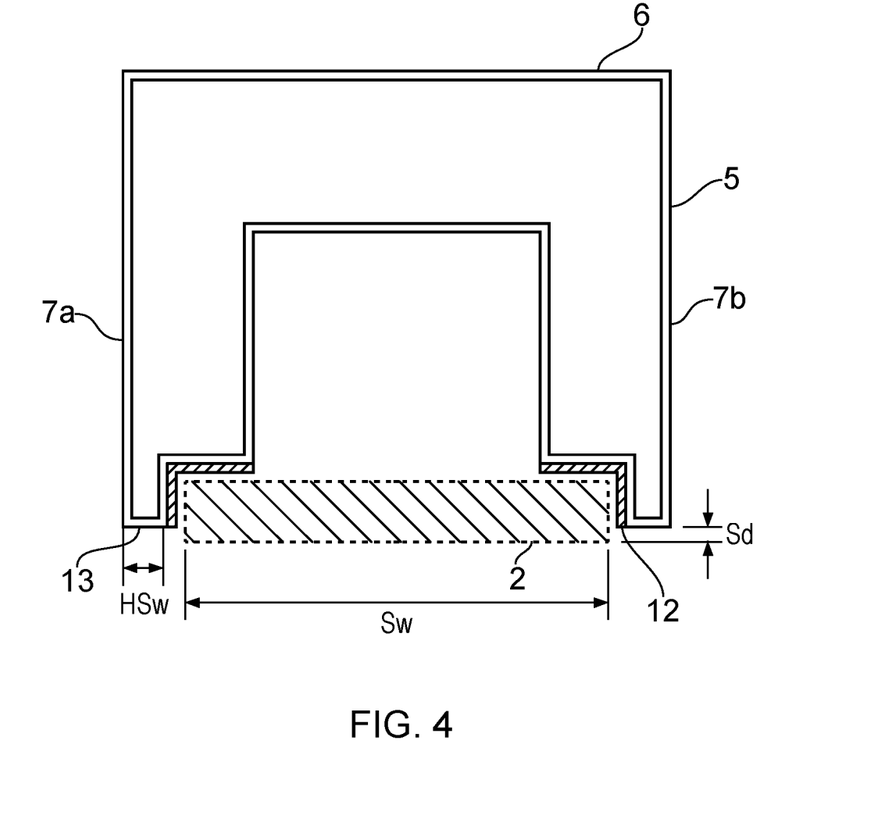
FIG. 4 shows a cross-section through the heat sink shown in FIGS. 2B and 2C.

FIG. 4 shows the heat sink, strip and insulator of FIG. 2B in more detail. As shown the heat sink 5 comprises two side portions 7a, 7b which extend towards the flexible strip 2. The ends of the portions 7a, 7b comprise a stepped cross-section which is configured as shown in FIG. 4 to receive the profile of the conductive strip.

It will be recognised that the stepped profile could be any geometry which is complimentary to the conductive strip and which can engage with a portion of the strip so as to transfer the welding load onto the strip and consequently onto the laminate.

The heat sink 5 and strip 2 are separated by a thermally insulating layer 12 which is located between the conductive strip and the heat sink. This prevents heat passing from the strip 2 into the heat sink itself (which would then itself become heated).

Any suitable material may be selected. Suitable examples include a glass fabric, a high temperature resistant coating or a separating material such as a ceramic or the like. The heat sink itself may also be any suitable material such as aluminium or stainless steel or the like. The flexible strip may equally be selected from any suitable material, such as for example steel, invar or stainless steel. More specifically and advantageously the material must be heat resistant to at least 500° C.

Returning to FIG. 4, the stepped cross-section of the end portions of sides 7a, 7b also includes a distal edge 13 which extends all the way along the heat sink (as shown in FIG. 2C. As shown in FIG. 4 the distal edge 13 is advantageously arranged so that it does not extend beyond the lowermost surface of the strip 2. The lowermost surface of strip 2 extends a distance $S_d$ beyond the lowermost surface of the edge 13.

In use the strip 2 (which is heated, as discussed further below) makes contact with the laminate surface before the edges 13 of the heat sink 5. This allows the strip to heat the laminate without the heat sink slowing the heating process. The welding pressure applied to the top surface 6 causes the strip 2 to penetrate the laminate surface until the edges 13 make contact with the laminate surface.

Figure 5A:
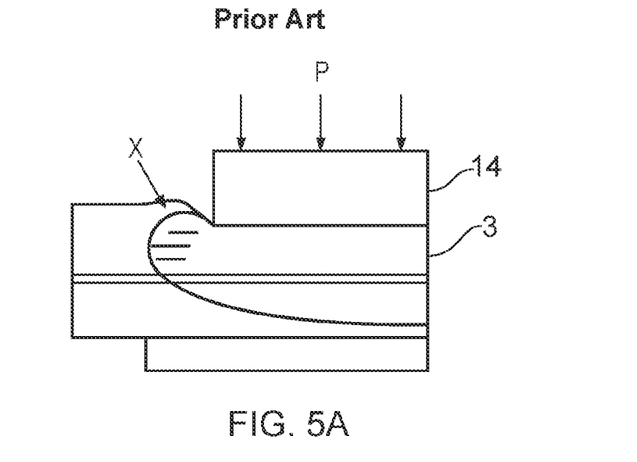
FIGS. 5A and 5B show the heat flow path during welding in a conventional welding process (FIG. 5A) and the present technique (FIG. 5B)
Figure 5B:
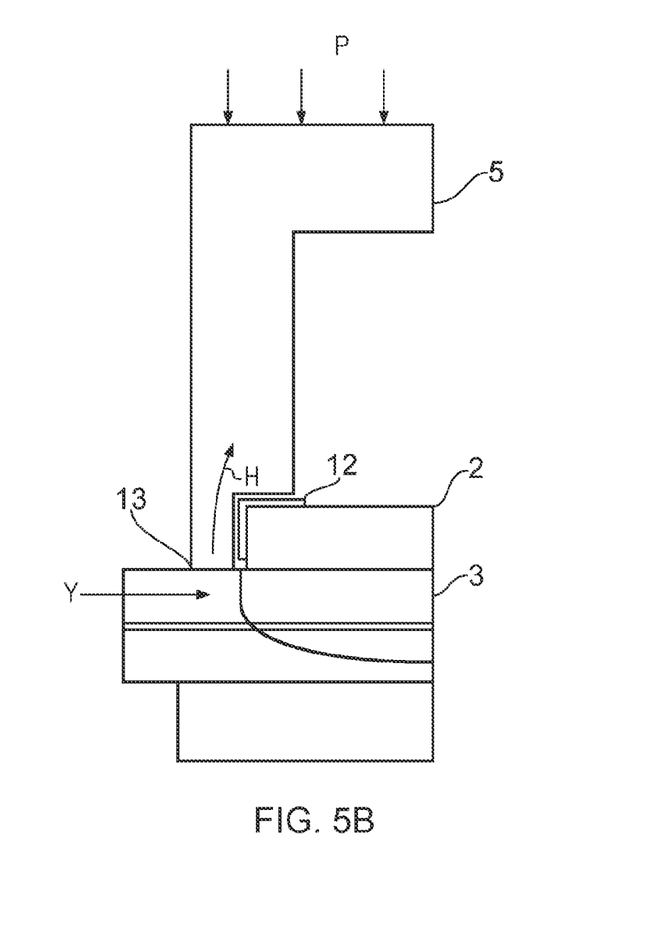

Once contact is made between the edges 13 and the upper surface of the laminate the heat sink begins to absorb heat from the laminate and communicate it away through the side portions 7a, 7b to the main body and root of the heat sink. This is described further with reference to FIG. 5.

Returning to FIG. 4, the heat transfer characteristics of the apparatus can be selected depending on the depth distance $S_d$ and the ratio of $HS_w$ and $S_w$ i.e. the ratio of areas of edge portion 13 and strip 2.

The advantageous thermal effects of the present tooling arrangement can be seen with reference to FIGS. 5A and 5B.

FIG. 5A shows the conventional laminate welding approach in which a heated portion 14 is applied to the laminate 3. As illustrated by arrow X the heat conducts outwards from the weld zone and heats a surrounding area of the laminate. This heating can not only cause delaminations (as discussed above) but also surface irregularities as illustrated by the convex portion in FIG. 5A immediately adjacent to the heated portion 14.

Conversely, a different thermal distribution can be seen in FIG. 5B which is a weld apparatus according to the present disclosure. As shown the strip 2 is insulated from the heat sink 5 by the insulator 12. The strip is brought into contact with the laminate 3 through the weld pressure P. The edge portion 13 of the heart sink is now in contact with the laminate surface immediately adjacent to the weld zone and as shown the weld zone Y constrained beneath the strip 2. Here, excess heat is being prevented from conducting out horizontally but is instead collected by the heat sink and directed away from the laminate (as illustrated by arrow H). This prevents delamination and damage to the lamination around the weld zone.

Thus, the heat sink aspect of the present welding apparatus alone provides for an improved laminate welding technique.

Other synergistic aspects of the tooling will now be described with reference to FIG. 6.

Figure 6:
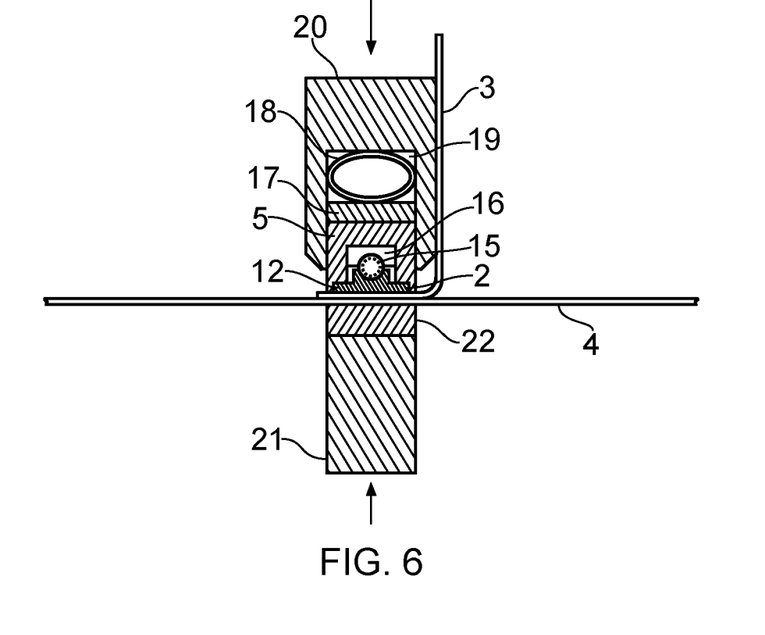
FIG. 6 shows a cross-section through a welding apparatus according to an invention described herein.

FIG. 6 shows a cross-section of a welding apparatus incorporating the flexible heat sink arrangement described above. In FIG. 6 a reinforcement rib 3 is being attached to a horizontal laminate surface 4. Like components discussed above are shown in the cross-section of FIG. 6, namely the flexible strip 2, insulating layer 12 and heat sink 5. The remaining portions of the welding tool will now be described.

As described above, the flexible strip 2 conveys heat to the laminate to effect the welding. Heat is provided to the by means of an electrically powered heating element which in the embodiment shown in FIG. 6 is located in a concave recess formed in the top of the flexible strip 2. An insulator is then located on top of the electrical heating element so that the element is surrounded on a lower half by the concave recess of the strip 2 and on an upper half by a concave recess in the upper insulator 16. The upper insulator insulates the heat sink from the heat generated by the electrical heater. Thus, the heater 15, insulator 16 and flexible strip are contained within the space formed within the central area of the heat sink.

Advantageously the electrical element 15 and upper insulator 16 may also be flexible so that they can flex with the strip 2 and heat sink 5 to accommodate variations in laminate surface profile as discussed above with reference to FIG. 3.

Immediately above the heat sink 5 can be seen a flexible rubber strip 17 which is positioned between the heat sink 5 and an inflatable rubber hose or bladder 18. These components are all located within a void 19 of the tooling upper housing 20.

The inflatable hose is connected to a gas or air supply (not shown) and can be selectively inflated to a predetermined pressure within the void 19. Inflation causes the bladder to expand and apply a force to the upper surface of the rubber strip 17. This in turns applies a force to the upper surface 6 of the heat sink 5 which is itself coupled to the flexible strip. Thus, it can be seen that inflating the hose 18 can selectively apply the weld force to the heat sink and flexible strip 2.

The pressure in the hose may be selected depending on the specific configuration. Advantageously to apply a suitable weld pressure the pressure in the hose may be in the region of 6 bar+/−1 bar.

Referring to FIG. 6, the welding tool house is shown into which the arrangement described above is contained. The housing comprises an upper housing 20 containing the hose 18, rubber strip 17, heat sink 5, insulator 16, electrical heater 15 and flexible strip 2. Opposing the upper housing is a second lower housing 21 which acts as a surface against which the welding pressure/force can be applied. The lower housing comprises a heat resistant and insulating surface 22 against which the laminate 4 contacts during welding.

The lower housing 21 may be in the form of a lower half of an anvil which is coupled to the upper housing allowing the two to be brought together or separated, thereby allowing the laminates to be located between the housing for welding.

In another arrangement the lower housing may be in the form of a fixed bed or jig and wherein the upper housing is movable relative thereto. Provided the lower housing/jig can support the laminate at the welding position a variety of arrangements may be possible. For example, the upper housing may be positioned on a robotic arm and the lower housing fixed. Multiple welds in different positions may then be performed.

In operation the welding process comprises the following steps:
  (a) the laminates 3, 4 are put in position with respect to the upper and lower housings;
  (b) the hose 18 is pressurised causing the heat sink and flexible strip to be forced onto the upper laminate, the lower housing contacts the lower laminate and the two are brought into close contact. Deformation of the flexible strip and heat sink accommodates and variations in surface profile;
  (c) an alternating induction current is applied to the copper coil 15 which heats the metal strip 2;
  (d) the generated heat is transferred to the thermoplastic composite parts 3 and 4 by conduction;
  (e) next to the heated strip 2 the heat sink 5 takes the heat from the thermoplastic composite part containing the heat in the desired area and preventing the metal strip from sinking too far into the thermoplastic composite part;
  (f) after a predetermined period of time the electrical induction coil is deactivated and the resin within the laminates solidifies causing the two laminates to be bonded i.e. welded together; and
  (g) the hose pressure is released and the upper and lower housing moved away.

As discussed above the welding apparatus remains in place until the weld has cooled to a predetermined temperature, for example to below 200° C.

Figure 7:
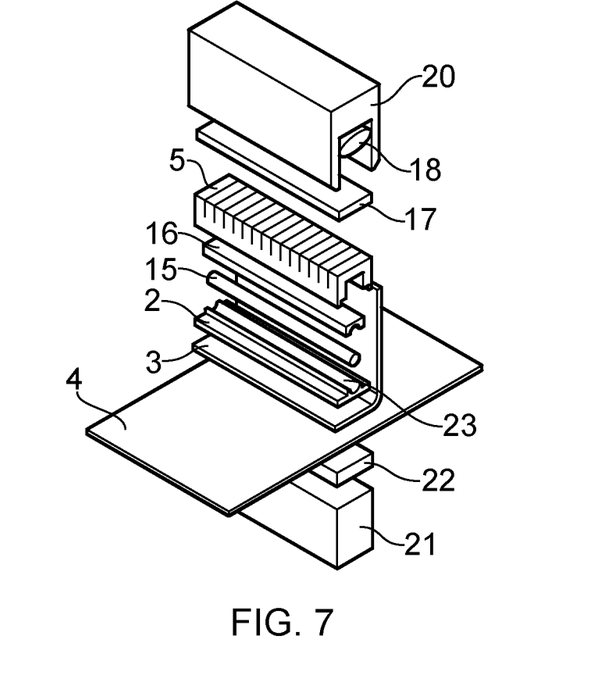
FIG. 7 shows an isometric exploded view of the welding apparatus shown in FIG. 6.

FIG. 7 shows an exploded isometric view of the subcomponents of the apparatus described above. FIG. 7 more clearly shows the upper surface of the flexible strip 2 which incorporates a concave portion to receive the heating element 15.

Figure 8:
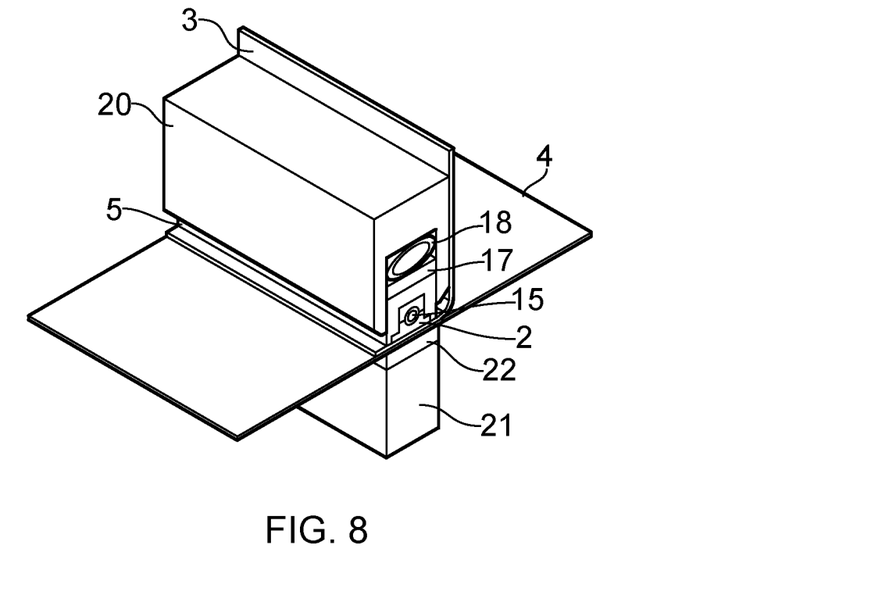
FIG. 8 shows the welding apparatus at a stage where welding can take place.

FIG. 8 shows an isometric view of the tooling in-situ for welding a reinforcing rib 3 to a flat laminate structure 4. The slits, which are visible in the exploded view in FIG. 7, are hidden behind the upper housing in FIG. 8.

The width of the slits is selected to be as narrow as possible and are driven by the minimum width of the machine tool (saw blade) which can be used for the chosen material. The thinner the slits the higher the 'definition' of surface imperfection or deformations which can be accommodated. The depth is a balance between flexibility and durability of the heat sink. Deeper slits result in increased flexibility while reducing durability.

Additionally, the heat conductive strip may also be segmented in the same way. Thus, the conductive strip may also closely align with the part surface.

Figure 9:
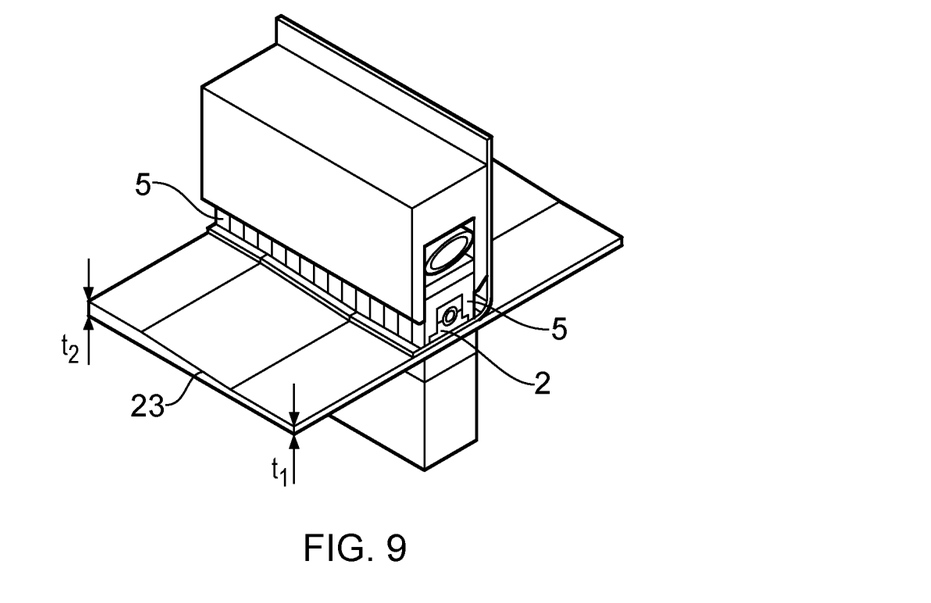
FIG. 9 shows an alternative embodiment with a sub-divided heat sink and sub-divided conductive strip.

FIG. 9 shows an alternative configuration of heat sink. Referring back to FIG. 7 the heat sink comprises a plurality of slits which extend from the upper surface of the heat sink down the side portions. The individual segments created by the slits are all coupled together as shown in FIG. 7.

FIG. 9 shows an alternative configuration in which the segments are completely divided i.e. the slits are formed all of the way through the heat sink. This forms a plurality of independent segments making up the heat sink which can each move independently of adjacent segments.

Dividing the heat sink in this way presents a number of advantages.

For example, dividing the heat sink in this way allows for greater movement of adjacent segments with respect to each other and this allows for greater differences in surface profile of the laminate surface to be accommodated by the welding tool.

Furthermore, dividing the segments in this way prevents eddy currents from developing in the heat sink by virtue of the alternative current passing through the adjacent coil. This in turn prevents resistance being generated by the eddy currents against the AC supply.

An electric insulation coating may advantageously be used. Such a coating would be effective to prevent excessive eddy currents in the fully divided heat sink (thus, the heat sink may be prevented from excessive heating due to the induction field in the heater).

Another way to prevent excessive eddy currents in the fully divided heat sinks is to limit the contact between the heat sinks to the heat sink corners. This can be done by machining a small recess in the heat sink to heat sink contact surface face while leaving the corners to contact the other heat sinks. Since the corners are far away from the induction coil, electrical contact in the corners causes almost no heating of the heat sink due to the induction field in the heater.

FIG. 9 illustrates the way in which the flexible heat sink and strip 2 can accommodate larger changes in the thickness of the laminates which are to be welded. As shown in FIG. 9 the laminate structure comprises a ramp 23 which ramps from first thickness $t_1$ to a second thickness $t_2$. The heat sink 5 is also visible and the continuous contact of the heat sink and laminate can be seen. Similarly (but not visible) the flexible strip 2 also follows the contour of the laminate ramp 23.

Figure 10:
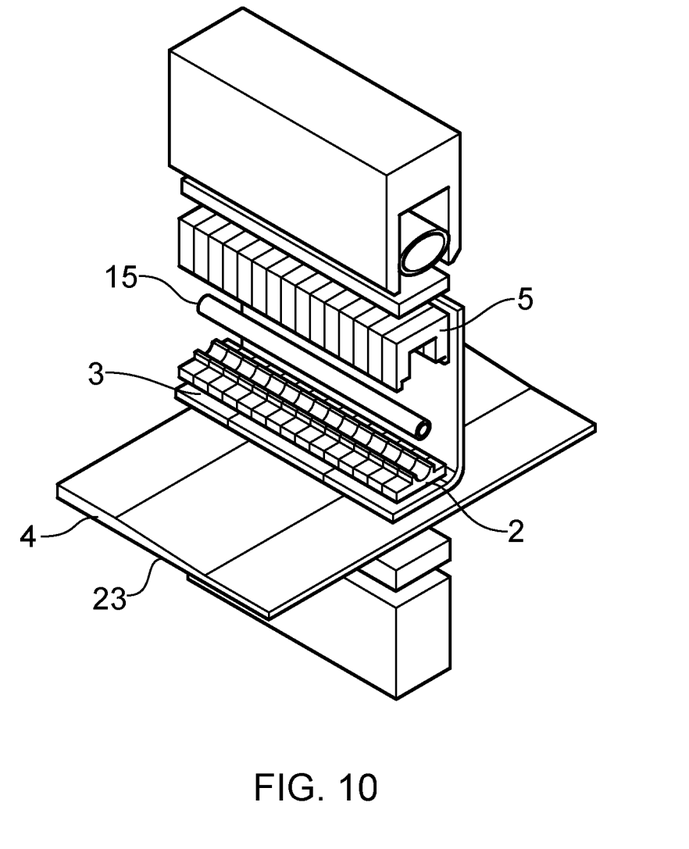
FIG. 10 shows an exploded isometric view of the welding apparatus shown in FIG. 9.

FIG. 10 is an exploded view of the arrangement shown in FIG. 9. The individual segments of the heat sink 5 can be seen. Similarly, the flexing of the coil can also be seen corresponding to the change in thickness of the laminate caused by the ram 23.

Figure 11:
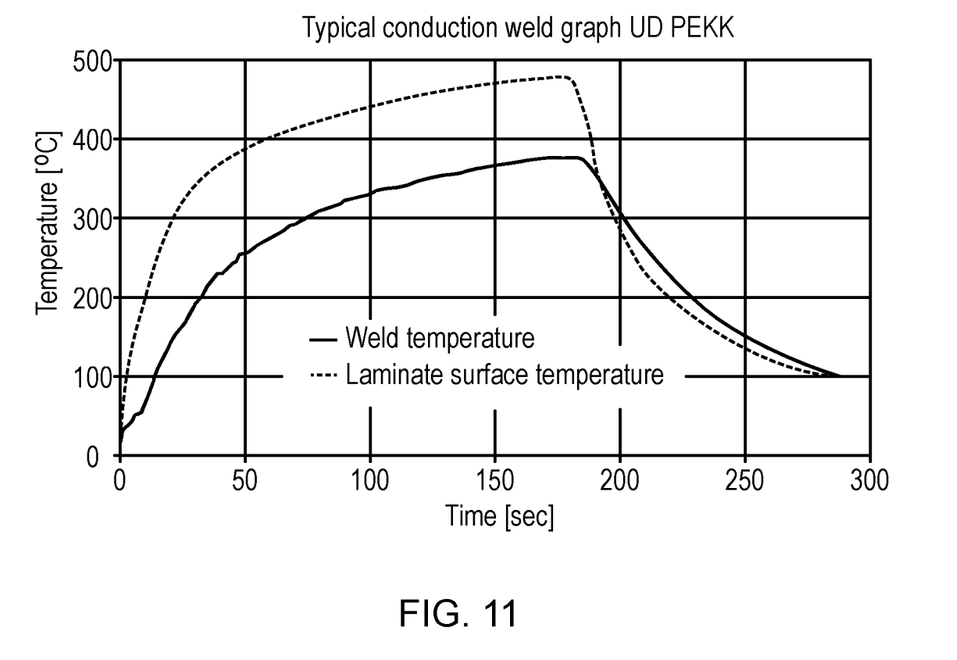
FIG. 11 shows an example of a welding graph of time versus temperature for a UD PEKK material.

FIG. 11 shows a conduction weld graph with time versus temperature and illustrates the temperature of the laminate during the weld process.

Specifically, the graph of FIG. 11 shows the conditions for welding an example material, such as UD Polyether Ketone Ketone (PEKK). The term 'UD' means Uni-Directional and it refers to the pre-preg plies, which consists of fibers in one direction only, as opposed to a fabric (woven) pre-preg layer. Generally welding of UD materials is more difficult (because there is less resin). UD material is mostly used in primary aircraft structure i.e. parts of the structure that are flight critical.

The material melt temperature for this matrix system is approximately 330° C. and for a good weld 375° C. is required, similar to autoclave consolidation of laminates. The surface temperature of the part in contact with the heating element is higher to obtain a temperature gradient over the thickness of the stack i.e. the layers forming the complete laminate. This temperature is limited by the degradation temperature of the PEKK system and is kept below 490° C. The surface temperature of the part which is not in contact with the heating element should preferably remain solid and therefore be <330° C. The heat sink is therefore configured to ensure that heat is removed from the weld zone to maintain the surrounding laminate below this temperature.

The induction coil frequency was found not to be critical for heating effectivity and the precise power input needed to achieve an optimal weld depends on the length and characteristics of the coil. As examples, both 300 kHz and 30 kHz can produced good quality welds.

Alternative arrangements to apply the weld pressure could also be employed, for example pressure could be applied by a robotic arm or a spring loaded arrangement.

However, by using a hose system the weld pressure can be easily guaranteed by checking the pressure in the pneumatic system. If rubber blocks or springs are used, this is more difficult as the (local) amount of pressure then depends on the amount of compression and the spring stiffness (possible calibration and aging issues). Furthermore, if a rubber block is used, heating of the rubber block by carrying out the welding process will create additional expansion, further complicating an even pressure distribution. Thus, the hose arrangement provides a number of technical advantages.

Optionally the heat sink and/or flexible strip may be provided with thermocouples which allow for real time feedback control of the current being applied to the coil. This allows the weld temperature to be accurately controlled according to the desired weld conditions as shown for example in FIG. 11.

Applications of the welding apparatus and method described herein include (but are not limited to):
stiffeners to skins to create a stiffened skin
frames to stiffened fuselage skin panels
ribs to skin panels in torsion box applications
spars to skin panels in torsion box applications
small brackets to other parts

The invention claimed is:

1. A welding apparatus for a fibre reinforced thermoplastic resin based material, the welding apparatus comprising:
   an elongate flexible heat conductive strip; and
   an elongate heat sink extending around at least a portion of the perimeter of the conductive strip;
   wherein the elongate heat sink is divided into a plurality of segments;
   wherein adjacent segments can move relative to one another.

2. A welding apparatus as claimed in claim 1, wherein the elongate flexible conductive strip is an elongate metallic strip.

3. A welding apparatus as claimed in claim 1, wherein the elongate heat sink comprises a backing portion and a pair of side portions extending away from the backing portions to define a void between the side portions and the backing portion.

4. A welding apparatus as claimed in claim 3, wherein the flexible heat conductive strip is divided into a plurality of segments.

5. A welding apparatus as claimed in claim 4, wherein the heat sink is divided into a plurality of segments by slots, wherein the slots extend through the backing portion and (a) along at least a portion of the length of each side portion with a distal portion of the side portions, or (b) along an entire length of each side portion.

6. A welding apparatus as claimed in claim 3, wherein a distal end of each side portion defines an edge extending along a length of the heat sink and arranged to contact the surface of a fibre reinforced resin based material.

7. A welding apparatus as claimed in claim 3, wherein a space defined between the distal portions of the side portions is arranged to receive the elongate flexible strip.

8. A welding apparatus as claimed in claim 7, wherein an electrical insulator is disposed between the elongate flexible strip and an adjacent portion of the heat sink.

9. A welding apparatus as claimed in claim 7, wherein the distal portions of the side portions of the heat sink comprise a stepped profile such that a surface of the elongate flexible strip aligns with a surface of the stepped profile and a perpendicular side of the elongate flexible strip aligns with a side of the stepped profile.

10. A welding apparatus as claimed in claim 6, wherein a portion of the elongate flexible strip extends beyond a most distal limit of the heat sink measured from the backing portion.

11. A welding apparatus as claimed in claim 3, wherein the void is further provided with an elongate heat source extending along at least a portion of the length of the apparatus.

12. A welding apparatus as claimed in claim 11, wherein the heat source is an electrical induction coil or an electrical resistance heated element.

13. A welding apparatus as claimed in claim 12, wherein the electrical conductor further comprises a first electrical insulator on a first side of the conductor and a second electrical insulator on an opposing second side of the conductor.

14. A welding apparatus as claimed in claim 13, wherein the first side of the electrical conductor faces the elongate flexible strip and the opposing side of the electrical conductor faces the void within the heat sink and is arranged to be received within the void.

15. A welding apparatus as claimed in claim 14, further comprising a housing comprising a blind recess arranged to receive the elongate heat sink, elongate flexible strip, electrical conductor, and electrical insulators.

16. A welding apparatus as claimed in claim 15, wherein the recess further comprises an inflatable hose within the recess and arranged to apply a force on inflation against the backing portion of the heat sink.

17. A welding apparatus as claimed in claim 16, wherein a thermal insulator is disposed between the inflatable hose and the backing portion of heat sink.

18. A welding apparatus as claimed in claim 1, wherein heating is controlled in response to one or more temperature sensors arranged in use to detect the weld temperature.

19. A welding apparatus for a thermoplastic based material, the welding apparatus comprising:
a flexible elongate heat conductive strip and an associated heat source arranged to direct heat in a first direction to a laminate surface to be welded; and
a heat sink extending laterally from the longest edges of the elongate strip and arranged to collect heat from the laminate surface and to communicate heat in a second opposing direction,
wherein the heat sink is divided into a plurality of segments, adjacent segments movable relative to one another, so as to align in use with deformations in a thermoplastic based material to be welded.

* * * * *